United States Patent [19]

Wilstrand et al.

[11] Patent Number: 5,277,138
[45] Date of Patent: Jan. 11, 1994

[54] APPARATUS FOR THE PLANTING OF CUTTINGS

[75] Inventors: Ragnar Wilstrand; Mats Wilstrand, both of Hedemora, Sweden

[73] Assignee: Wilstrand Svets & Mek, AB, Hedemora, Sweden

[21] Appl. No.: 856,969

[22] PCT Filed: Nov. 28, 1990

[86] PCT No.: PCT/SE90/00789
§ 371 Date: May 20, 1992
§ 102(e) Date: May 20, 1992

[87] PCT Pub. No.: WO91/07866
PCT Pub. Date: Jun. 13, 1991

[30] Foreign Application Priority Data

Nov. 29, 1989 [SE] Sweden .................................. 8904035

[51] Int. Cl.⁵ .............................................. A01C 7/00
[52] U.S. Cl. ................................................... 111/170
[58] Field of Search ................ 111/170, 103, 104, 918, 111/96, 907, 906, 200, 900; 47/1.7

[56] References Cited

U.S. PATENT DOCUMENTS 3,279,400 10/1966 Gonzalez .
3,931,774 1/1976 Bradley ................................ 111/109
4,084,465 4/1978 Dugas .............................. 111/907 X

FOREIGN PATENT DOCUMENTS

0138442  8/1950 Australia .............................. 111/907
0146285  5/1952 Australia .............................. 111/907
0216086  7/1958 Australia .............................. 111/907
0067141 12/1982 European Pat. Off. .
  72635  3/1987 Finland .
8103646-9 2/1987 Sweden .
1127890  9/1968 United Kingdom .

Primary Examiner—Randolpha A. Reese
Assistant Examiner—Christopher J. Novosad
Attorney, Agent, or Firm—Young & Thompson

[57] ABSTRACT

The invention relates to an apparatus for planting cuttings one by one, which includes a propelled or towed frame supported by rotatable support wheels, a feeding apparatus for cuttings to be planted and intended for bringing the cuttings into contact with a driving device vertically displaceable in a planting tube. The feeding apparatus is designed for receiving, one by one, cuttings which have been cut in advance to a length suitable for planting of full shoots or such portions thereof the length of which exceeds the length of a cutting intended for planting. The planting tube and at least one portion of the feeding apparatus are movable relative to each other. Cutting apparatus is provided in connection with the feeding apparatus for cutting off a fed, full shoot or a portion thereof during relative movement, whereupon a cutting cut off to a suitable length by the relative movement, during the final phase thereof, is brought to a position in the path of movement of driving apparatus.

15 Claims, 5 Drawing Sheets

APPARATUS FOR THE PLANTING OF CUTTINGS

The present invention relates to an apparatus for planting cuttings one by one, of the kind indicated in the characterizing portion of patent claim 1.

SE-A-8103646-9 discloses an assembly for planting cuttings by means of spring-actuated driving means cooperating with feeding tubes for ready-cut cuttings having a predetermined, relatively short length. For the manmvring of the driving means these are connected to a line the other end of which is connected to a rotatable arm for alternately pulling and slackening the line.

Such a prior art assembly is sensitive to disturbance and is dependent upon relatively even ground in order to be able to perform adequate planting. Furthermore said assembly is exclusively intended for planting cuttings of a predetermined length, which means that whole or full shoots (stalks, stems) must be cut in advance to cuttings of predetermined lengths. Said prior art machine also works with a fixed distance between the planted rows and the spring-actuated driving means requires a relatively soft planting ground or soil.

Thus, the primary object of the present invention is to provide a planting apparatus permitting the use of full shoots, portions of full shoots as well as cuttings of a predetermined length.

This primary object of the invention is achieved by means of a planting apparatus of the kind indicated in the characterizing portion of patent claim 1.

Accordingly, in the solution suggested by the invention the feeding apparatus, which may also be referred to as a storage space, is dimensioned so that it may receive, one by one, upright full shoots, portions of full shoots or cuttings that have been cut in advance and that may be planted without any further processing. Through a relative motion between the planting tube, with the driving means displaceably received therein, and the feeding apparatus, receiving the full shoot or the like, a cutting of the full shoot etc, is performed through cutting means provided adjacent the feeding apparatus, and in the same step it is achieved that a portion (cutting) of a full shoot or the like cut in such a manner is brought to a position in the path of movement of the driving means so that it may be actuated by this driving means.

A planting apparatus designed in the above indicated manner becomes very efficient due to the fact that a precutting of full shoots to cutting lengths is eliminated, which is otherwise a relatively time-consuming work. The feeding apparatus may cooperate with different types of hoppers or magazines, whereby a synchronizing is preferably performed between the work of the planting apparatus and the feeding of cuttings or full shoots from the magazine and into the feeding apparatus.

In a preferred embodiment the feeding apparatus and the planting tube are provided vertically side by side, and the reason for this is to obtain as short movements as possible for the relative motion therebetween. In this connection it has been found to be specifically advantageous to design the feeding apparatus such that it comprises a portion movable relative to the planting tube and adapted to bring a cutting cut from a full shoot or the like to its position below the driving means, in the path of movement of the driving means in the planting tube, by its swinging movement. The swinging or pivotable portion of the feeding apparatus is thereby provided having a length substantially corresponding to, but in practice slightly exceeding the predetermined length of a cutting to be planted.

According to another advantageous embodiment of the invention the planting apparatus is designed so that during a planting process an essentially fixed distance is maintained between the ground surface and the downwardly directed end of the planting tube, irrespective of the ground condition.

Preferred further developments of the inventive concept further suggest that the cutting means are provided in the shape of two reel cutters cooperating with each other to cut the full shoot or the like during the relative motion, whereby a clean surface of cut is achieved; that before the planting process the full shoot or the cut cutting are supported on a base of the planting tube, said base being displaceable away from said supporting position; that the lower portions of the feeding apparatus and of the planting tube are surrounded by protective housings shaped as ground engaging, rotatable wheels which together with the planting tube are movable in the vertical plane in order to guarantee that a cutting is always driven down to the optimum depth, irrespective of the ground condition; and that the planting apparatus is equipped with one single power source, preferably in the shape of a hydraulic cylinder, which means that the costs may be significantly reduced and that the reasons for malfunction may be reduced at the same time. This single power source mechanically drives all of the functions required by the planting apparatus. The planting process is carried out due to the fact that the power source is activated in dependence upon the rotation of at least one of the support wheels.

A further advantageous development of the invention is directed to providing the possibility of performing a stepless adjustment of the distance between subsequently planted cuttings and also a stepless adjustment of the distance between two adjacent rows of planted cuttings.

Other characterizing features of the invention are clear from the following description, claims and drawings.

Embodiments of the invention will be more closely described below in connection with the enclosed, to a great extent schematical drawings, on which.

Figure 1:
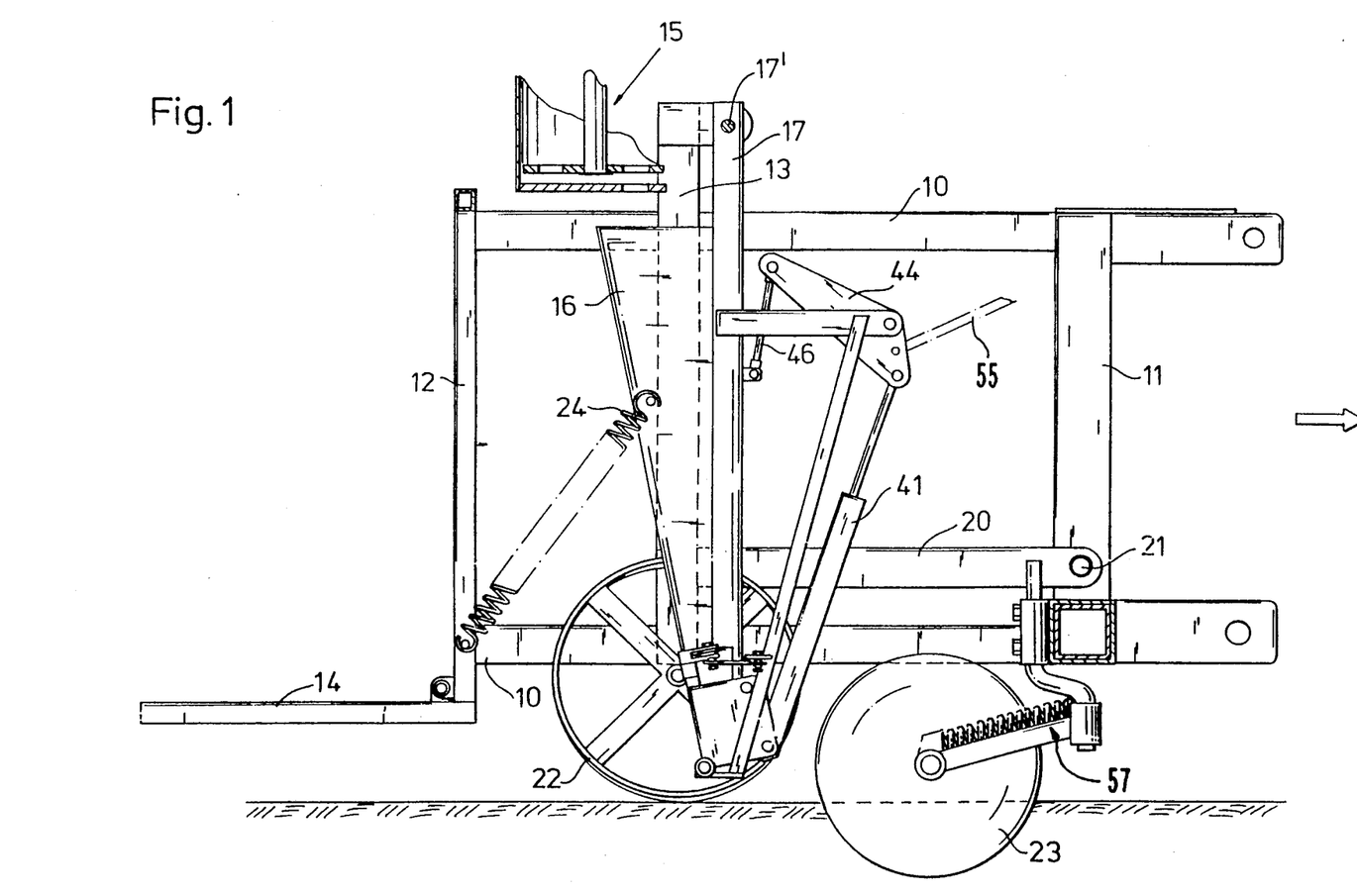
FIG. 1 is a schematic side view of a planting apparatus according to the invention for planting cuttings.

Referring to FIG. 1, the apparatus for planting cuttings comprises a frame consisting of horizontal fixed frame parts 10 spaced in the vertical plane and mutually connected to vertical posts 11, 12 of which the post 12 is firmly connected to a platform 14 for the manual service of at least one existing space 15 for cuttings. This space 15 may for instance be in the shape of a turret magazine, but it should be emphasized that the invention is in no way restricted to this kind of magazine but may be operated together with optional types of magazines. Below the space 15 a feeding apparatus 16 is vertically extended, and in the embodiment illustrated in the drawings said feeding apparatus comprises a vertical wall portion and an inclined wall portion, which gives the feeding apparatus 16 a hopper-like shape. The vertical wall portion of the feeding apparatus 16 is connected to a vertically disposed planting tube 17. The feeding apparatus 16, which opens upwardly towards the magazine space 15 and downwardly opens towards the planting tube 17, and the planting tube 17 both terminate in approximately the same horizontal plane, at a small distance above the ground level. If the space 15 is a turret magazine or any other type of automatic magazine cuttings may be automatically fed to the feeding apparatus 16.

Figure 1A:
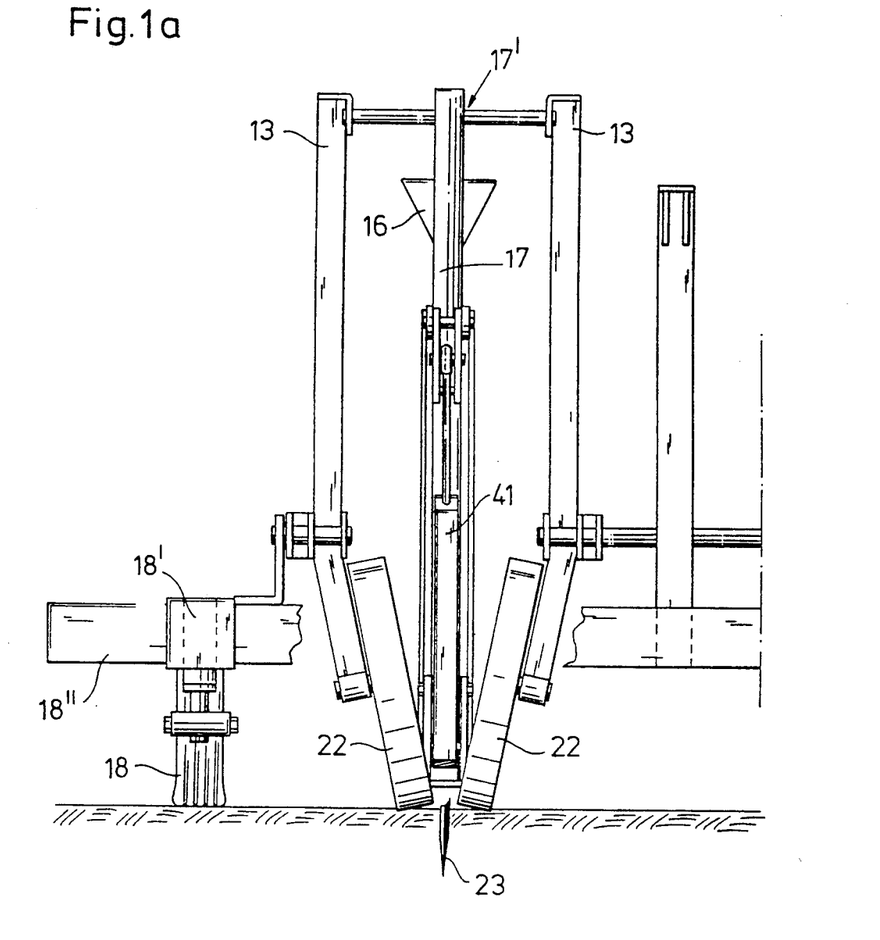
FIG. 1a is a front view of the apparatus according to FIG. 1.

FIG. 1a illustrates that the above described frame is supported by two rotatable support wheels 18. These support wheels 18 are each rigidly attached to a respective sleeve 18', and these two sleeves 181 are in turn displaceable along a beam 18" extended transversely to the advancing direction of the machine (see the arrow in FIG. 1).

The planting apparatus essentially consisting of the feeding apparatus 16 and the planting tube 17, is provided between the support wheels 18 and also between laterally spaced support beams 13.

The planting tube 17 is swingably connected to an upper joint 17' and is thus supported by the support beams 13 so as to be pivotal about the joint 17'. The pivoting of the planting tube 17 about the joint 17' is necessary in order to make sure that during advancement of the planting machine during the planting the planting tube 17 maintains its position relative to the ground during the time sequence of the driving-down of a cutting into the ground. Otherwise, if the planting tube were firmly mounted, no appropriate planting of the cutting could be performed since the movement of the machine during the driving-down phase could cause the cutting to be inclined and in the worse case to break. In the cases where the planting machine is advanced at low speed it may be sufficient if the planting tube 17 is freely swingable about the joint 17' so that, when driving down the cutting, the planting tube is maintained in the driving-down position by the cutting during the advancement of the machine, and so that the planting tube after terminating the planting operation is swung back to the initial position for a new planting process by gravity or by spring force, etc. To provide increased safety of operation, and above all for securing a reliable function when advancing the machine at higher speeds, it is however preferable to synchronize the swinging of the planting tube 17 with the driving movement for the planting operation. This synchronizing may for instance be performed by means of a linkage 55 which is only indicated in FIG. 1 and which on one side is connected to the rocker member 44 of the drive mechanism to be described more closely below, and which on the other side is connected to the planting tube in a manner not disclosed in the drawings.

As illustrated in FIG. 1 the beams 13 are each firmly connected to a respective horizontal arm 20, which is pivoted at the joint 21, and thereby the beams 13 are movable in a vertical plane about the joint 21 together with the cooperating means, i.e. the planting tube 17 and the feeding apparatus 16 which are indirectly supported by the beams 13, and also protective housings 22. As illustrated in FIG. 1a two protective housings 22 are provided which are each rotatably connected to the respective beam 13. The protective housings 22 are inclined and together form a ground engaging wheel the rotary speed of which is determined by the rate of advancement of the planting apparatus. Due to the pivoting about the joint 21 the ground engaging wheel 22 may always be in contact with the ground irrespective of the ground conditions, and thereby a predetermined distance between the lower end of the planting tube 17 and the ground is guaranteed. Normally the weight of the assembly pivotable in the described manner and consisting of beams 13, planting tube 17, feeding apparatus 16 and ground engaging wheel 22 is sufficient for maintaining the ground engaging wheel 22 in contact with the ground, but under certain circumstances it may be desirable to connect a spring 24 with predetermined biasing between the pivotal assembly, more specifically the beams 13 of FIG. 1, and a fixed portion of the frame, such as the vertical beam 12, in order to maintain the protective housings 22 securely engaging the ground.

Referring further to FIG. 1, a so called disc coulter 23 may be provided, the purpose of which is to prepare the ground where necessary before the planting of the cuttings. This disc coulter is therefore positioned in front of the planting apparatus, as seen in the advancing direction indicated by means of the arrow F in FIG. 1, and is provided with an overload protection system indicated at 57. Thus, the disc coulter is, in a manner not illustrated in detail, pivotal in a vertical plane, counteracting a spring force, so that it may swing away from rocks in the ground.

Figures 2, 3:
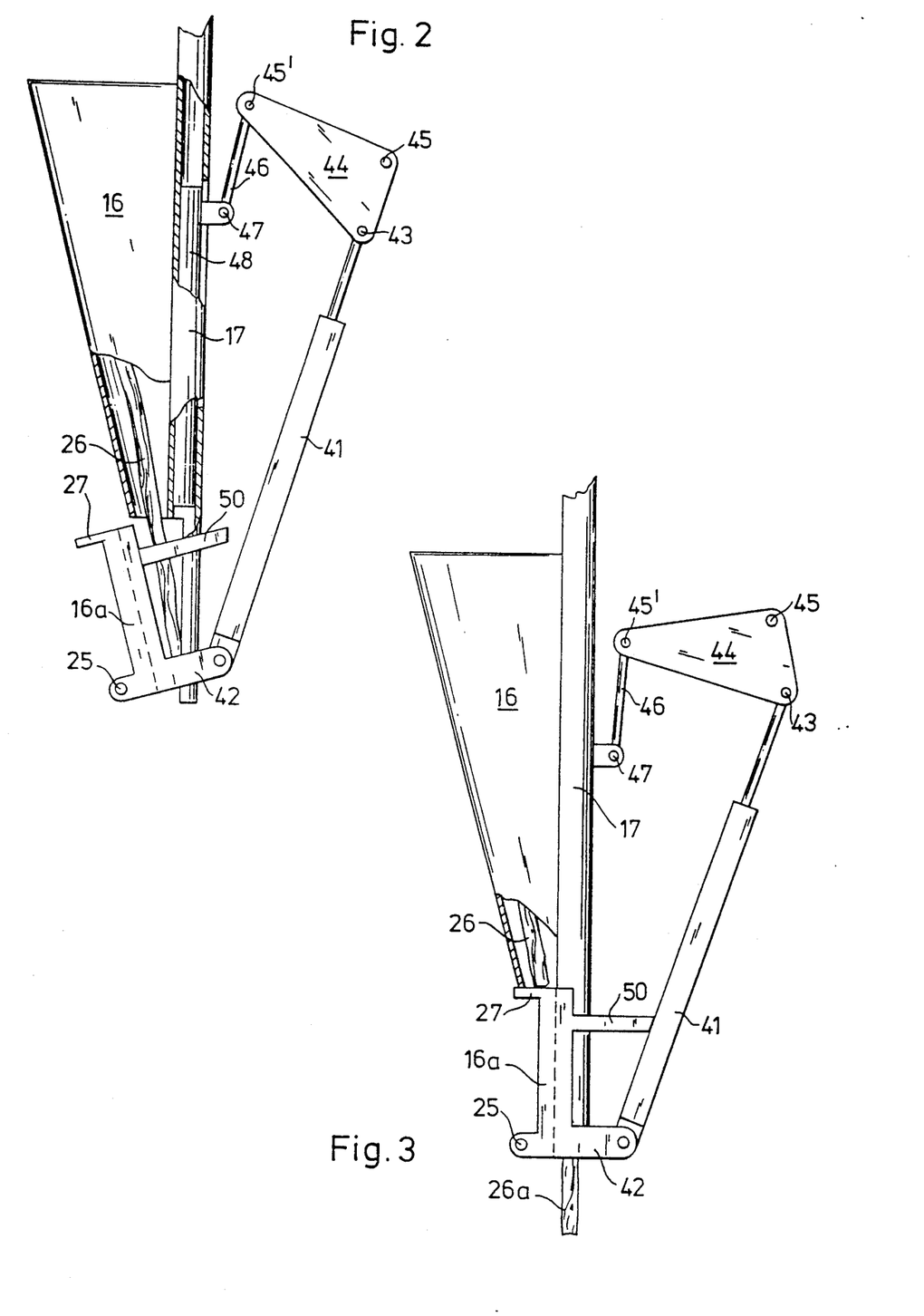
FIG. 2 is a schematic detail view of one embodiment of the feeding apparatus in the shape of a funnel-like supply space in a first position, the planting tube and the drive mechanism.
FIG. 3 illustrates the embodiment of FIG. 2 with the feeding apparatus in a second position.

FIGS. 2 and 3 schematically illustrate a first general embodiment of the feeding apparatus of the planting apparatus according to the invention, together with a planting tube and drive means. In this embodiment the feeding apparatus 16 is divided into an upper portion and a lower pivotal portion 16a. This lower portion 16a is arranged for limited movement about a joint 25 from a position (FIG. 2) permitting automatic feeding of a so called full shoot 26, i.e. having a length of normally 1.5 to 5 meters, from the magazine space 15 (or manually) whereby the lower end of the full shoot 26 abuts a bottom plate (not shown) at the lowermost end of the planting tube 17, which bottom plate may be swung away. From this first end position the lowermost portion 16a is pivotal towards the planting tube 17.

FIGS. 2 and 3 further indicate that the planting tube 17 at the lower portion thereof has an approximately semi-circular cross-section and that the pivotal lower portion 16a of the feeding apparatus likewise has an approximately semi-circular shape in cross-section. When the pivotal lower portion 16a has reached a second end position (FIG. 3) it therefore forms a vertical continuation of the planting tube 17. The full shoot 26 which in FIG. 2 extended from the bottom plate of the planting tube 17, which may be swung away and which is not illustrated, to the upper portion of the feeding apparatus 16, is subjected to cross-cutting by means of cutting means deleted from FIGS. 2 and 3 but illustrated in FIG. 4 and 5, by the movement of the pivotal portion 16a from the first, in FIG. 2 illustrated end position to the second, in FIG. 3 illustrated end position. The result of this is that a cutting 26a having a predetermined length is brought with the portion 16a in its movement towards the planting tube 17 and is brought to its planting position in the planting tube 17, whereas the remaining portion of the full shoot 26 remains standing in the upper portion of the feeding apparatus (FIG. 3) with its end abutting a stop 27 at the upper side of the movable portion 16a. In the case where reel cutters according to FIGS. 4 and 5 are employed as cutting means these may form the stop for the remaining portion of the full shoot in the upper portion of the feeding apparatus.

Although FIGS. 2 and 3 illustrate the upper portion of the feeding apparatus shaped as a feeding funnel, it should be emphasized that this upper portion may within the scope of the invention be modified in different ways, and may for instance perform a positive, controlled feeding-down of the full shoots into the pivotal lower portion.

Figure 4:
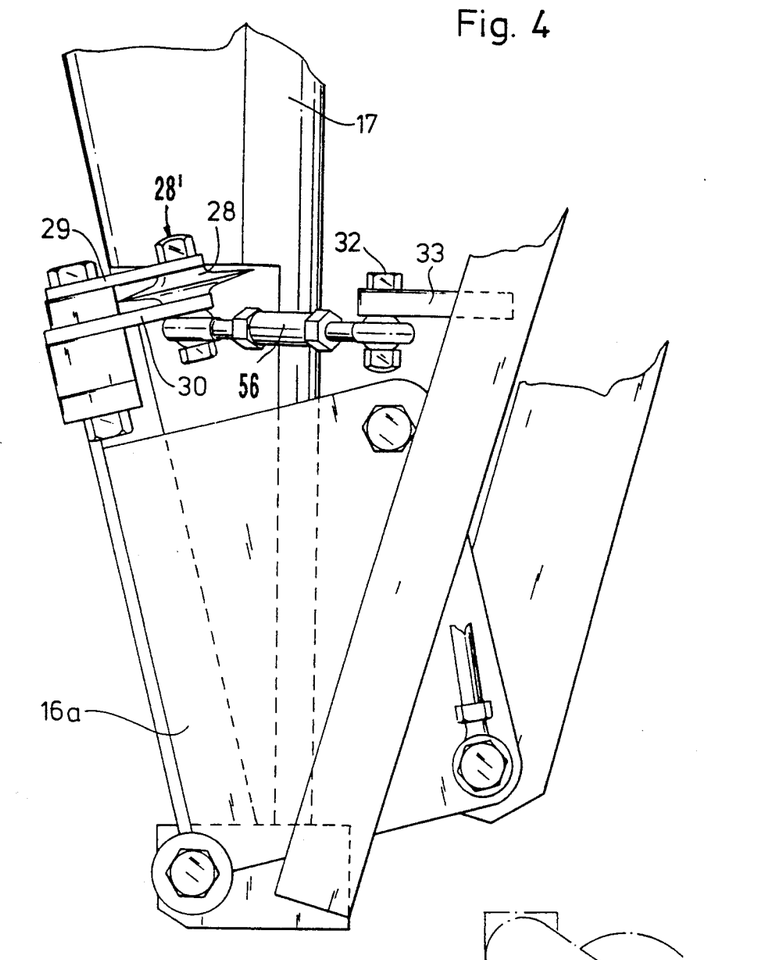
FIG. 4 is a detail view from the side of a second embodiment of the lower swingable portion of the feeding apparatus provided with cutting means.
Figure 5:
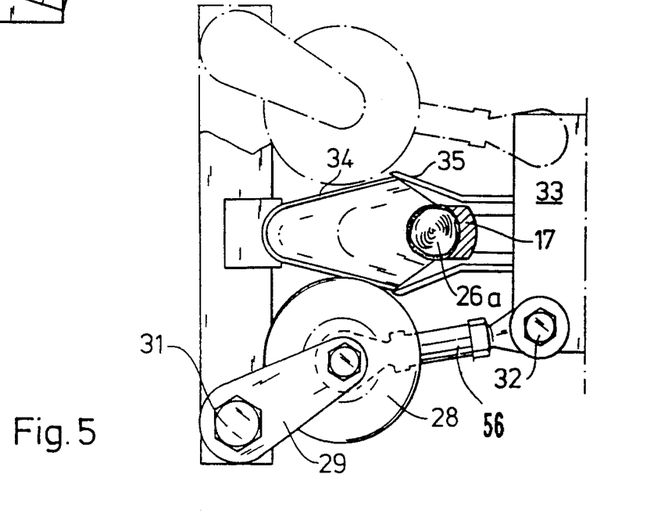
FIG. 5 is a view from above of the embodiment according to FIG. 4, FIGS. 6a-6d illustrate a modified embodiment of the feeding apparatus, where the upper as well as the lower portions thereof are swingable.

FIGS. 4 and 5 illustrate an example of a cutting means providing clean and smooth cut edges and being attached to the upper edge of the pivotal portion 16a. Two opposing reel cutters 28 are rotatably clamped between two plates 29, 30 and these plates are pivotal about an axis 31 provided at the outer edge of the portion 16a. Links 56 are with one end thereof pivotally connected to an extension of the rotary or joint axis 28' of the reel cutters 28 and are with the other end thereof pivotally connected to a second pivot 32 provided in a mounting plate 33. When the pivotal portion 16a receives an impulse to move to the second end position illustrated in FIG. 3, the above described arrangement will bring the knives 28 to move towards the full shoot to be cut off. The remaining portion of the full shoot may rest on the upper side of the knives or cutters 28. One or two reel cutters or the like may be employed.

It is obvious that it is likewise possible to employ other cutting means for cutting off a full shoot.

FIG. 5 also illustrates that the rear wall 34 of the pivotal portion 16a may consist of a flexible plastic sheet arranged to slide in guides 35. When the movable or pivotal portion moves towards a second position, the sheet 34 is pushed inwardly and at the end of the path of movement of the portion 16a it is brought to engage the cutting 26a thereby guaranteeing the correct vertical positioning of the cutting in the planting tube 7.

FIGS. 6a-6d schematically illustrate an example of a modified embodiment of the feeding apparatus illustrated in for instance FIGS. 2 and 3.

Figure 6A:
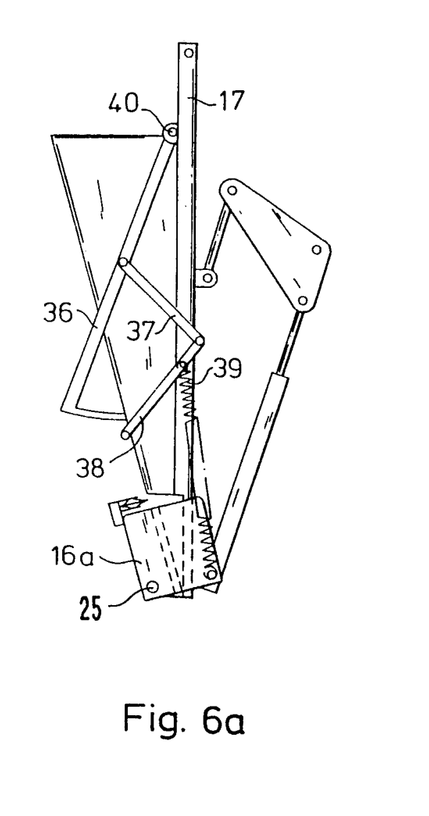
Figure 6B:
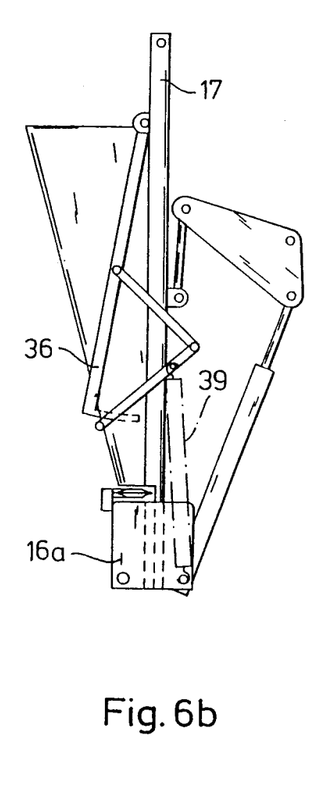
Figure 6C:
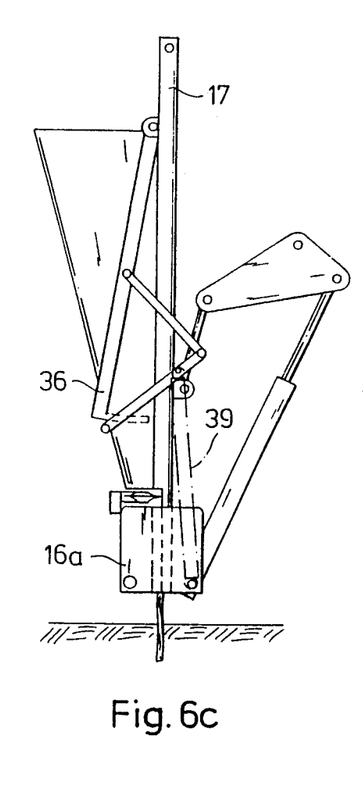
Figure 6D:
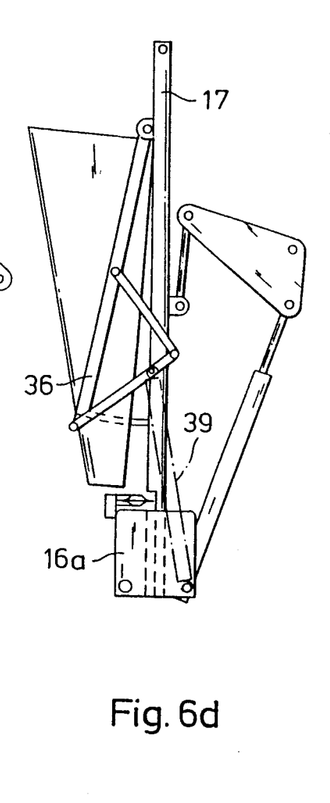

FIG. 6a is comparable to FIG. 2 when it comes to the operation, i.e. the movable portion 16a is in a receiving position. In FIG. 6b the portion 16a is in the second end position, whereby the full shoot has been cut off with the above described knife or cutter arrangement. In order to detect whether or not the remaining portion of the full shoot has such a length that it may form a cutting that may be planted, there are provided three links 36, 37, 38 which are interconnected and a spring 39. When the pivotal portion 16a is swung to said second end position, the links 37, 38 are actuated since one end of the spring 39 is attached to the link 38 and its other end is attached to the movable portion 16a. The movement of the links 37, 38 bring about a movement of the arm 36 in a direction towards the planting tube 17. If there remains a full shoot of such a length that it may later be used as a cutting for planting, this portion of the full shoot will, under the force from the arm 36, which is primarily arranged to detect the possible existense of a full shoot, be forced to engage the right, straight wall of the feeding apparatus 16. In the case illustrated as an example the portion of the full shoot will be clamped during the planting of the earlier cut off cutting (FIG. 6c). The links 36-38 will not return to their initial position until the pivotal portion 16a returns to its receiving position. When the links 36-38 return the portion of the full shoot is released so that it falls down into the movable portion 16a by gravity. FIG. 6d illustrates the same position as FIG. 6b except that the link 36 has not detected the presence of any acceptable portion of a full shoot. The link 36 thereby continues through an opening in the right wall of the feeding apparatus 16 and contacts the planting tube 17. Thereby, the links 37, 38 force the upper portion of the feeding apparatus 16 to swing about an upper pivot 40 in a direction away from the planting tube 17 so that when a non-acceptable portion of a full shoot exists it may fall freely out through the lower opening of the space 16.

In order to explain the drive arrangement employed for achieving the above described planting process, reference is once more made to FIGS. 1, 2 and 3. A hydraulic cylinder 41 is pivotally connected to the moving portion 16a through a flange 42. The piston rod end 43 of the cylinder 41 is pivotally connected to a rocker member 44 which is pivotally supported at 45. A transfer arm 46 is with one of its ends pivotally connected to the rocker member 44 at 45' and is with the other end thereof pivotally connected to a flange 47 which is in turn connected to a cylindrical driving means 48, provided inside the planting tube 17. When the cylinder 41 receives an activating impulse it will initially bring the moving portion 16a to commence its movement towards the second end position since, in this position, the hydraulic cylinder 41 is not capable of turning the rocker member 44 about the pivot 45, depending upon the fact that in this position the hydraulic cylinder 41 acts directly through the pivot 45, see FIG. 2, without any lever, whereby the pivotal movement of the rocker member 44 is blocked. When the lower portion 16a of the feeding apparatus 16 approaches the final phase of its pivoting about the joint 25 it will through an actuating member 50 provide an initial movement to the hydraulic cylinder 41 moving the latter clockwise in FIG. 3, i.e. so that the hydraulic cylinder 41 does no longer act through the pivot 45 of the rocker member 44 but the rocker member is instead swung anti-clockwise in FIG. 2 and 3 by the hydraulic cylinder 41, whereby the driving means 48 initiates its planting movement through the transfer arm 46. Thereby, the arrangement is such that when the movable portion 16a has completed its swinging movement the cutting is appropriately vertically oriented inside the planting tube 17 so that the driving means 48 may complete the planting process. The above described movement pattern may also be achieved without the actuating member 50, by providing such a geometry for the arrangement consisting of the link 42, the hydraulic cylinder 41 and the rocker member 44, that the pivotal connection of the hydraulic cylinder 41 to the flange 42 under the final phase of the swinging movement of the lower portion 16a is automatically moved such in relation to the pivot of the rocker member 45 that the hydraulic cylinder 41 will act to turn the rocker member about the pivot 45.

Referring to FIGS. 6a–6d it is obvious that the hydraulic cylinder 41 also contributes to moving the links 36–38 described in connection therewith.

The rocker member 44 is designed and arranged in such a manner that the initial movement of the driving means 48 is quick but relatively powerless or weak. Towards the end of the movement of the rocker member 44 the lever becomes longer and thereby the force acting on the driving means 48 increases. Thus, the invention teaches employing one single piston/cylinder means for performing all steps of the above described planting process.

Figure 7:
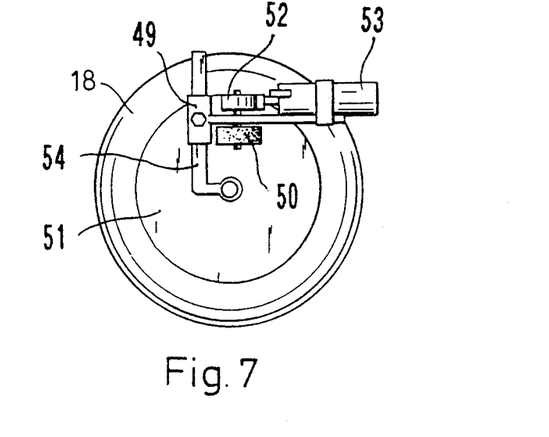
FIG. 7 illustrates an example of how the actuation of the drive assembly is controlled depending upon the rotation of one or both of the support wheels.

FIG. 7 finally illustrates an example of how the hydraulic cylinder 41 may be actuated depending upon the rotation of the support wheel or support wheels 18. A bracket 49 which is supported at the wheel 18 by means of an arm 54, is movable generally in a direction towards and away from the center of the wheel 18 and may be fixed in an optional position. The bracket 49 carries a rubber wheel 50 engaging a circular plate disc 51 provided on the side of the support wheel 18. When the support wheel 18 rotates the small rubber wheel 50 also rotates and its rotational movement is transferred to a cam disc 52 which in turn actuates a valve 53 in turn activating the hydraulic cylinder 41 through hydraulic lines which are not illustrated. In the illustrated embodiment the hydraulic valve is actuated once for each full turn completed by the cam disc 52. The transmission rate of the small rubber wheel 50, i.e. its rotary speed, may be changed by moving it closer to or further away from the center of the wheel 18, whereby the planting distance between two adjacent cuttings may be steplessly varied within the given limits. Naturally, this adjustment of the distance between the planted cuttings of each row, may be achieved in a plurality of equivalent manners, controlled by the rotation of the support wheel 18.

In the embodiment illustrated in the drawings the apparatus according to the invention, for planting cuttings, is intended to be removably attached to a tractor or any other self-propelled machine, or may alternatively be self-propelled in itself.

By extending or expanding the frame one, two or even more apparatuses of the kind described above may be arranged side by side and accordingly one, two or several planting rows may be obtained. Due to the fact that several planting assemblies provided side by side may be laterally displaced independently of each other on the frame, the distance between adjacent rows of cuttings may be steplessly changed.

By using one single hydraulic cylinder, and in the case where the apparatus according to the invention is towed, the pressure fluid source of the towing vehicle (tractor) may be employed for driving or operating up to four planting apparatuses arranged side by side. Although the selected embodiments employ a hydraulic cylinder as power source it should be obvious to the man skilled in the art that other power means may likewise be employed.

We claim:

1. Apparatus for planting cuttings of a suitable length one by one, comprising:
    a propelled or towed frame supported by rotatable support wheels;
    a planting tube extending substantially vertically relative to said frame;
    means for feeding, one by one, cuttings of suitable length for planting or cuttings requiring trimming to a suitable length for planting, said feeding means extending substantially vertically relative to said frame and in side by side relationship to said planting tube, said feeding means including a pivotal lower portion which is pivotal towards said planting tube in a planting position and away from said planting tube in a non-planting position;
    means in connection with said pivotal lower portion for cutting a cutting, which is longer than a suitable length for planting, in response to pivoting of said pivotal lower portion to said planting position;
    means vertically displaceable in said planting tube for driving a cutting, of suitable length for planting, relative to said planting tube and said pivotal lower portion after said pivotal lower portion as been pivoted to said planting position; and
    means for pivoting said pivotal lower portion and driving said driving means.

2. Apparatus according to claim 1 wherein said pivotal lower portion extends between a first end and an opposite second end, the length between said first end and said opposite second end being substantially equal to a predetermined length of a cutting to be planted.

3. Apparatus according to claim 1 wherein said cutting means comprises one or more knives disposed adjacent an upper end of said pivotal lower portion, said one or more knives forming a stop member for any cutting which is disposed within said feeding means and above said pivotal lower portion when said pivotal lower portion is provided to said planting position.

4. Apparatus according to claim 3 wherein said pivotal lower portion and a discharge segment of said planting tube are adjacent a protective housing shaped as a rotatable, ground engaging wheel which together with said feeding means and said planting tube is mounted in said frame being pivotal about a pivot positioned such that said ground engaging wheel, said feeding means and said planting tube are pivotal substantially in a vertical plane following the ground condition but maintaining their mutual height position.

5. Apparatus according to claim 1 wherein said planting tube comprises a discharge segment including a lower opening, said lower opening being provided with a bottom, said bottom being moveable between closed and open positions relative to said lower opening for, respectively, supporting a cutting before actuation of said driving means and releasing said cutting during actuation of said driving means.

6. Apparatus according to claim 5 wherein said pivotal lower portion and a discharge segment of said planting tube are adjacent a protective housing shaped as a rotatable, ground engaging wheel which together with said feeding means and said planting tube is mounted in said frame being pivotal about a pivot positioned such that said ground engaging wheel, said feeding means and said planting tube are pivotal substantially in a vertical plane following the ground condition but maintaining their mutual height position.

7. Apparatus according to claim 1 wherein said pivotal lower portion pivots about a pivot, said pivot being located near a discharge segment of said planting tube, said discharge segment having a generally semi-circular cross-section, said pivotal lower portion having a semi-circular cross-section, and said discharge segment and said pivotal lower portion complement one another to form a tubular discharge opening of said planting tube when said pivotal lower portion is pivoted to said planting position.

8. Apparatus according to claim 7 wherein said pivotal lower portion and a discharge segment of said planting tube are adjacent a protective housing shaped as a rotatable, ground engaging wheel which together with said feeding means and said planting tube is mounted in said frame being pivotal about a pivot positioned such that said ground engaging wheel, said feeding means and said planting tube are pivotal substantially in a vertical plane following the ground condition but maintaining their mutual height position.

9. Apparatus according to claim 1 wherein said pivotal lower portion and a discharge segment of said planting tube are adjacent a protective housing shaped as a rotatable, ground engaging wheel which together with said feeding means and said planting tube is mounted in said frame being pivotal about a pivot positioned such that said ground engaging wheel, said feeding means and said planting tube are pivotal substantially in a vertical plane following the ground condition but maintaining their mutual height position.

10. Apparatus according to claim 9 wherein said feeding means, said planting tube and said driving means form a planting assembly which is pivotal about a horizontal axis in said frame so that during the actual planting process said planting assembly may maintain its position relative to the ground independent of the advancing movement of the planting apparatus.

11. Apparatus according to claim 10 wherein one single power source comprising a hydraulic cylinder, is mechanically connected to said driving means and to said pivotal lower portion of said feeding means.

12. Apparatus according to claim 1 wherein said feeding means, said planting tube and said driving means form a planting assembly which is pivotal about a horizontal axis in said frame so that during the actual planting process said planting assembly may maintain its position relative to the ground independent of the advancing movement of the planting apparatus.

13. Apparatus according to claim 1 wherein one single power source comprising a hydraulic cylinder, is mechanically connected to said driving means and to said pivotal lower portion of said feeding means.

14. Apparatus according to claim 1, wherein said driving means comprises a solid, cylindrical body surrounded by said planting tube and being connected to a piston rod of a hydraulic cylinder through a transmission means.

15. Apparatus according to claim 1 wherein at least one of said support wheels comprises means for actuating said hydraulic cylinder, said actuating means being dependent upon rotation of said at least one of said support wheels.

* * * * *